March 23, 1971 L. J. CIANCAGLINI 3,572,313
CHARCOAL COOKING "VERTA GRILL"
Filed Sept. 17, 1968
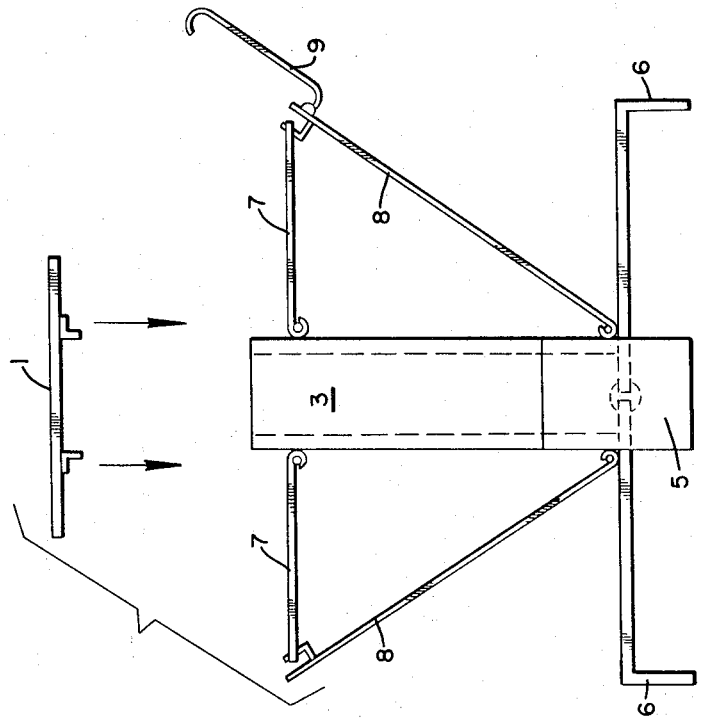
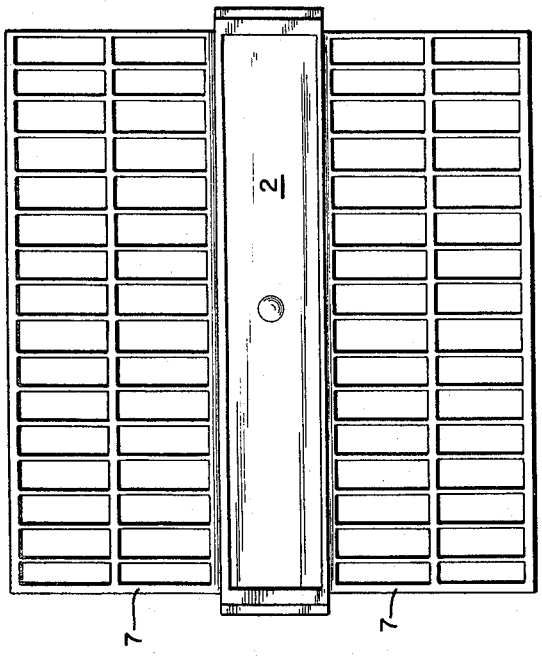
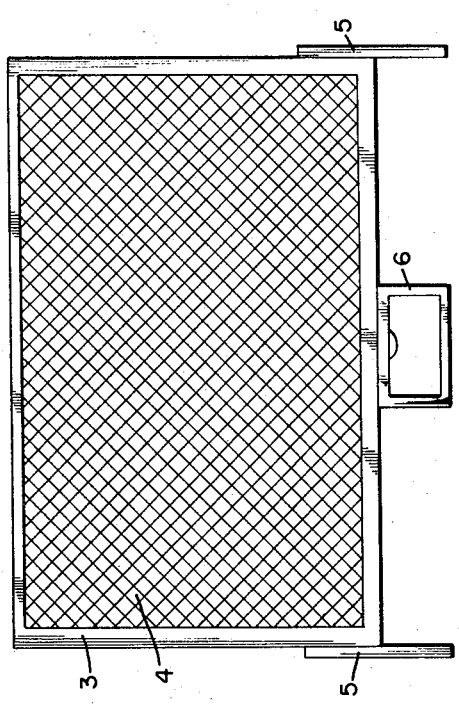
INVENTOR.
LOUIS J. CIANCAGLINI

United States Patent Office 3,572,313
Patented Mar. 23, 1971

3,572,313
CHARCOAL COOKING "VERTA GRILL"
Louis J. Ciancaglini, 4231 SW. 41st St.,
West Hollywood, Fla. 33023
Filed Sept. 17, 1968, Ser. No. 761,401
Int. Cl. A47j 37/00; F24b 3/00; F24c 1/16
U.S. Cl. 126—9                                                    1 Claim

ABSTRACT OF THE DISCLOSURE

A portable foldup charcoal grill comprised of a vertical firebox with grid members, reflective side plates, and support legs pivotally attached to the firebox. The side plates are adapted to cover the grid members and firebox side walls when in an inward fold position.

---

This invention relates to a novel and useful charcoal barbecue grill, and more particularly to a fold-up portable charcoal grill of the type normally used outside for preparing food for picnics, camping, and the like. As is common knowledge, charcoal grills have been used solely for meats and the like, side dishes and hot drinks usually had to be prepared earlier and carried to the site. My invention will provide on-the-site cooking of these same side dishes and drinks, to be fried, boiled, or warmed on the same grill, at the same time, also combining a time and space saver, allowing the grill to be kindled at home with prepackaged fuel or paper kindling and charcoal and ignited at the site. In conventional grills, the meat is cooked directly over the burning coals, grease, and liquids dripping from the meat and fats are flammable and will burst into flames upon contact with the glowing coals, giving off obnoxious fumes and gases that may impair the flavor of the food being cooked. The objective of my invention is to provide a barbecue grill which will be efficient in the transmission of radiant heat to the food, and be economical in its fuel consumption to provide a grill having an extensive reflector to utilize radiant heat energy which is ordinally lost in such devices. To provide a grill producing a superior flavor in barbecued meats and the like. This grill is designed and arranged so that the meat drippings cannot fall into the firebox to produce flame, fumes, and smoke, which will have a deleterious effect on the flavor of cooking food. The firebox is arranged to emit direct heat from the glowing fuel to the underside of the grill and on each side of the firebox is a diagonally inverted reflector to deflect upward toward the grill all radiant heat from the sides of the firebox. The hot plates placed on the top of the firebox will reflect cooking heat laterally over the meats placed on the grids, giving a double action cooking effect. The relatively simple design and construction will make the manufacturing of an inexpensive, versatile, and compact, barbecue grill. The explanation and description of the drawings are as follows:

FIG. 1 illustrating top view of my invention shows open top of firebox, both attached grids of equal size locked in wing-like position. In dotted relief pivoting support legs 90° of firebox. FIG. 2 illustrates one side of the firebox, shows a base frame with fixed legs attached, open mesh metal over full face side. Pivoting legs in open support position. FIG. 3 illustrates an embodiment of FIG. 1 and FIG. 2 assembled. Pivoting legs in open support position. Both reflectors extending diagonally, both grids in horizontal position, locked in place with an unattached hot plate directly above open top of fire box. Numerically referring to illustrated drawing of FIGS. 1, 2, and 3, of my invention, 7 consists of two equal size grids suitably attached to upper portion on each side of 4, when in use will extend horizontally and supported by tabs cut out of 8. In fold up position, 7 will be placed down against the side of 4. 3 forms the base frame of firebox made of a light gauge metal or suitable material a slight inside fold for support, shaped to form a wide flat bottom U a strip of similar metal fastened to top section of 3 for additional support. 5 attached to each end of 3 suitably fastened of the same width of 3 make up rigid support legs. 6 made of appropriate gauge metal fabricated in a manner to fit flush to underside of 3 and inside of each 5 suitable fastened to 3 allowing 6 to pivot at least 90° forming the complete set of supporting legs. 4 an open mesh metal of approved design and gauge spot welded or fastened according to need to inside fold of 3. This forms the firebox. FIG. 3 illustrates an embodiment of FIGS. 1 and 2 picturing 8 reflectors fabricated of suitable metal to afford the most practical and efficient use of reflecting indirect radiant heat from buring fuel, properly fastened to 3 to extend diagonally with tab cut out of top to lock 7 grid in horizontal position, when closed will fold up tightly against outside of dropped 7. 9 carrying handle fastened on one of 8 to allow 9 to attach to opposite 8 when grill is folded up. 1 hot plate. Two of these fabricated of metal that will conform to the use and purpose of grill, with attachments on bottom side making it possible to slip over top side of 3 permitting supplementary cooking facilities, and heat deflection. The foregoing is considered as illustrative of the principles of the the invention. Further, since numerous modifications and changes will readily occur to those skilled in the art it is not desired to limit the invention to the exact constitution and operation shown and described. Accordingly all suitable modifications and equivalents may be resorted to falling within the scope of this invention as claimed.

I claim:
1. A portable foldup charcoal grill comprising a vertical, open top charcoal burning firebox, said firebox having a frame consisting of a bottom section and two end sections, said end sections extending a distance below the bottom section forming two rigid support legs, said firebox further including sidewalls of perforated material on each side of the frame extending between the end sections, the distance between the perforated sidewalls being just greater than the average width of a charcoal briquet whereby the briquets will be in close proximity to the sidewalls, a pair of reflective side plates fastened near the bottom section on each side of the firebox, a pair of grid members pivotally fastened near the top on each side of the firebox, said side plates when pivoted outwardly forming supports for the grid members when horizontally pivoted, said side plates when pivoted to an inward fold up position forming covers for the side walls of the firebox and grid members when vertically pivoted, handle means fastened to one of the side plates and adapted to clip onto the other of the side plates when folded up for portability or storage, and inverted U-shaped leg means pivotally fastened to said frame bottom section, said leg means being rotatable to a storing position between said rigid support legs and rotatable 90 degrees therefrom to a firebox supporting position, and means forming hot plates adapted to be placed on the open top of the firebox for additional cooking area and carried within the firebox for storing.

References Cited
UNITED STATES PATENTS

| | | | |
|---|---|---|---|
| 2,891,465 | 6/1959 | Rogge | 126—25UX |
| 2,943,557 | 7/1960 | Suehlsen | 126—25AX |
| 2,962,019 | 11/1960 | Lundgren | 126—25 |
| 3,040,651 | 6/1962 | Nolte, Jr. | 126—25X |
| 3,230,863 | 1/1966 | Carson | 126—25X |

CHARLES J. MYHRE, Primary Examiner

U.S. Cl. X.R.

126—25